(12) United States Patent
Beck (10) Patent No.: US 8,248,149 B2
(45) Date of Patent: Aug. 21, 2012

(54) APPARATUS AND METHODS FOR REGISTERING INPUTS FROM A USER

(75) Inventor: Idan Beck, Cupertino, CA (US)

(73) Assignee: Incident Technologies Inc., Cupertino, CA (US)

(\*) Notice: Subject to any disclaimer, the term of this patent is extended or adjusted under 35 U.S.C. 154(b) by 442 days.

(21) Appl. No.: 12/634,377

(22) Filed: Dec. 9, 2009

(65) Prior Publication Data

US 2011/0043274 A1 Feb. 24, 2011

Related U.S. Application Data

(60) Provisional application No. 61/201,468, filed on Dec. 11, 2008.

(51) Int. Cl.
*H03K 17/945* (2006.01)

(52) U.S. Cl. .................................... 327/517; 327/565
(58) Field of Classification Search .......... None
See application file for complete search history.

(56) References Cited

U.S. PATENT DOCUMENTS

| | | | |
|---|---|---|---|
| 6,013,923 A \* | 1/2000 | Huang | 257/59 |
| 8,089,300 B2 \* | 1/2012 | Redgrave | 326/40 |
| 8,097,926 B2 \* | 1/2012 | De Graff et al. | 257/419 |
| 2003/0101006 A1 \* | 5/2003 | Mansky et al. | 702/30 |

\* cited by examiner

*Primary Examiner* — Cassandra Cox (57) ABSTRACT

Embodiments of an electronic apparatus and method for are registering inputs from a user a generating corresponding output provided. The electronic apparatus may comprise a switching system and a monitoring system. The switching system may comprise a base surface, insulating blocks disposed on the base surface, an array of conductive pads, and conductive wires. The array of conductive pads comprises one or more rows and one or more columns of conductive pads that are provided with a first electric potential. The switching system may further comprise conductive wires suspended from the insulating blocks and may be suspended at a physical distance over the rows of conductive pads. The conductive wires are provided with a second electric potential. The inputs are registered when the user contacts the conductive wires with the conductive pads. Thereafter, the monitoring system analyzes the inputs to generate a corresponding output to the user.

44 Claims, 7 Drawing Sheets

APPARATUS AND METHODS FOR REGISTERING INPUTS FROM A USER

CROSS-REFERENCE TO RELATED APPLICATION

This application draws priority from U.S. Provisional Patent Application No. 61/201,468, filed on Dec. 11, 2008, and hereby incorporated by reference herein in its entirety.

FIELD OF THE INVENTION

The invention relates to electronic devices and more specifically the invention relates to electronic systems for registering inputs from a user.

BACKGROUND OF THE INVENTION

Various electronic devices use electronic switches for the user to provide inputs. For example, the electronic devices can be keyboards for computers, an input interface device for digital electronics, switch boards for complex electronic systems and/or the like. Typically, a switch is an electrical component that can be used to close or open an electrical circuit. Generally, an electromechanical switch contains two metal contacts. The two metal contacts may be brought into electrical conductance together to allow the flow of current through the switch. Therefore, the switch may be either in an 'on' state when the two contacts are passing current between them, or in an 'off' state when the two contacts are separated such that no current may transfer between the two contacts.

Such electronic devices may use arrays of electronic switches for enabling the user to provide inputs. The array may comprise rows and columns of switches. Further, the array may share a common current source and a common drain for all rows. A coordinate system may be used to designate the switches in the array. Further, digital electronics may be used to poll the electronic devices to determine the state of each switch in the array. Digital electronics allows polling for states of the switched in the coordinated system significantly faster than the human ability to switch the states of the switches. Therefore, the state of each switch in the array may not be required to be determined independently.

Similar functionality of the switches may be implemented in computer keyboards or other kinds of keypad devices. For example, U.S. Pat. No. 6,265,677 assigned to Acer Peripherals, Inc., discloses implementation of an array of switches in a computer keyboard. The keyboard uses copper printed on an integrated circuit board or a flexible material to produce the contacts. The contacts are designed in a concentric circle design with inward reaching fingers that point at the other contact but interlace such that they do not make contact. A plastic, or other material, key is placed above the contacts that when pushed down contacts the fingers to the contact and closes the electrical circuit. Therefore, a third contact such as the fingers are required to operate the switch. However, the third contact increases the complexity of design of the electrical switches.

The electronic switches used in keyboards or keypads may require a spring force to maintain separation between the contacts. For example, U.S. Pat. No. 4,580,018 assigned to Alps Electric Co., Ltd., and U.S. Pat. No. 4,490,587 assigned to Microdot Inc., disclose using spring nature of a physically deformed spring element to maintain separation. The spring element resists a compression force until a specific threshold is reached, and at that point the element may collapse and produces the contact. However, the consistency of the material of spring element is difficult to control. Moreover, the switched does not provide much electromechanical feedback. As a result, a micro-timing control of key presses is not possible. Micro timing may be essential in applications such as scientific experimentation, art, or real time interface devices. Furthermore, in most switch designs such as disclosed in U.S. Pat. No. 4,278,861 assigned to Casio Computer Co., Ltd., the actual contact of the metal contacts is generally hidden from view of the user, or is of negligible displacement. Therefore, the user may not be able to use a visual feedback to provide inputs.

A mechanism is therefore desirable to enable the user to register inputs with electronic devices.

SUMMARY

The present invention provides an electronic apparatus for registering inputs provided by a user. The electronic apparatus may comprise a switching system and a monitoring system. The switching system may comprise a base surface; one or more insulating blocks disposed on the base surface; an array of conductive pads arranged on the base surface, wherein the array of conductive pads comprises one or more rows and one or more columns of conductive pads, and wherein the conductive pads are provided with a first electric potential; and one or more conductive wires suspended from the one or more insulating blocks, wherein the conductive wires are suspended at a physical distance over the one or more rows of conductive pads, and wherein the conductive wires are provided independently with a second electric potential. The inputs are registered when the user contacts the one or more conductive wires with the one or more conductive pads. The monitoring system coupled to the switching system, wherein the monitoring system analyzes the inputs to generate a corresponding output to the user.

The invention further provides an electronic apparatus for registering inputs provided by a user and generating a corresponding output. The electronic apparatus may comprise a switching system and an monitoring system. The switching system may comprise a base surface; one or more insulating blocks disposed on the base surface; an array of conductive pads arranged on the base surface, the conductive pads being provided with a first electric potential, wherein the array of conductive pads comprises one or more rows and one or more columns of conductive pads, and wherein each conductive pad in the array of conductive pads is connected to one or more second ports; and one or more conductive wires suspended from the one or more insulating blocks, wherein the conductive wires are suspended at a physical distance over the one or more rows of conductive pads, and wherein the conductive wires are provided independently with a second electric potential from one or more first ports; and a conductive pin connected to the one or more third ports, the conductive pin being provided with a third electric potential, wherein the conductive pin is movable to contact the one or more conductive wires. The user provides the inputs by contacting the one or more conductive wires to the one or more conductive pads and the conductive pin. The monitoring system coupled to the switching system may comprise a processor configured to generate the output; a driving unit coupled to the processor and the one or more first ports, wherein the driving unit is configured to poll the conductive wires independently based on instructions from the processor; and a receiving unit coupled to the processor and the one or more second ports and the one or more third ports, wherein the receiving unit is configured to receive a result of polling performed by the driving circuit. The processor based on the result of the polling generates the output.

The invention further provides a method of registering inputs provided by a user and generating a corresponding output. The method comprising providing an electronic apparatus comprising a switching system and an monitoring system, the switching comprising: an array of conductive pads, one or more conductive wires suspended over the array of conductive pads, and the monitoring system comprising a processor, a driving unit, a receiving unit. Thereafter, the one or more conductive wires are pressed by the user to contact the one or more conductive pads in the array of conductive pads. The driving unit based on instructions from the processor independently polls the conductive wires. The result of the polling is received by the receiving unit and the result is transmitted to the processor. Subsequently, the result is processed by the processor to register the inputs provided by the user to generate the output.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

Illustrative embodiments of the invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Figure 1:
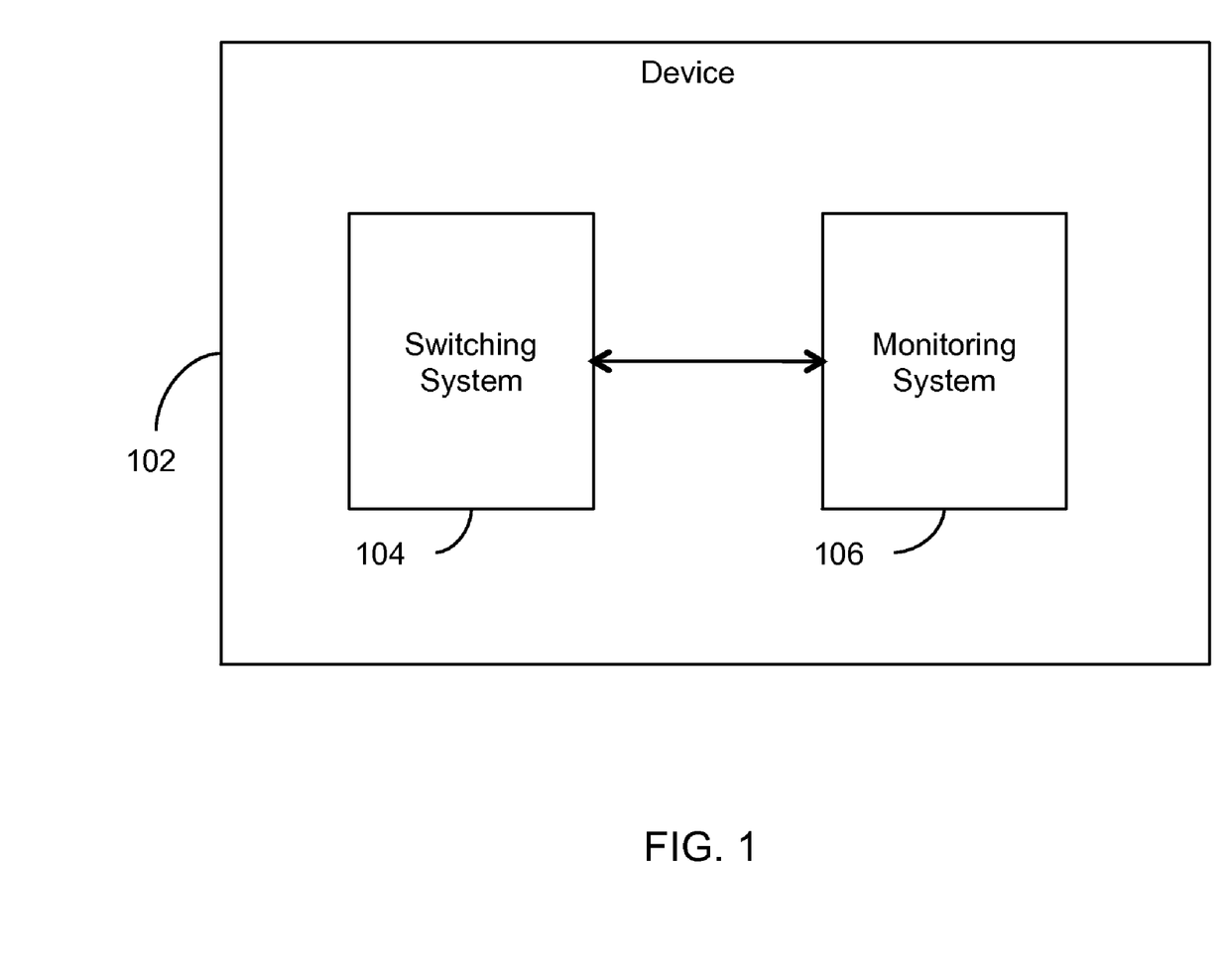
FIG. 1 is an exemplary block diagram of a device for registering inputs from a user, in accordance with an embodiment of the invention.

With reference to FIG. 1, an exemplary block diagram of a device 102 for registering inputs from a user is illustrated. Device 102 may be an electronic device that takes inputs from the user and generates corresponding output. Examples, of device 102 include, but are not limited to, a keyboard, a keypad, an input interface for an electronic or digital instrument and so forth. Device 102 can provide a feedback to the user based on the input or the output. Examples of feedback include, but are not limited to, a mechanical feedback, a visual feedback, an audio feedback and so forth. Furthermore, device 102 can be connected to other electrical or electronic devices to provide output or feedback to the user. For example, the other electronic devices can be a computer, a laptop and the like. Moreover, device 102 may be connected to other devices through wired or wireless means. Device 102 includes a switching system 104 and a monitoring system 106 to take inputs and/or provide output to the user.

Switching system 104 includes multiple conductive wires suspended over an array of conductive pads. The user may provide an input by pressing the wires on to the conductive pads. Therefore, switching system 104 may function as an array of electronic switches. However, unlike the electronic switches generally known in the art, switching system 104 does not require an element to connect metal contacts for opening or closing the flow of current. The inputs provided by the user are monitored and analyzed by monitoring system 106 to generate an output. Furthermore, switching system 104 provide the user micro timing control of the inputs. The components and functioning of switching system 104 are explained in detail in conjunction with FIGS. 2, 3 and 4.

Figure 2A:
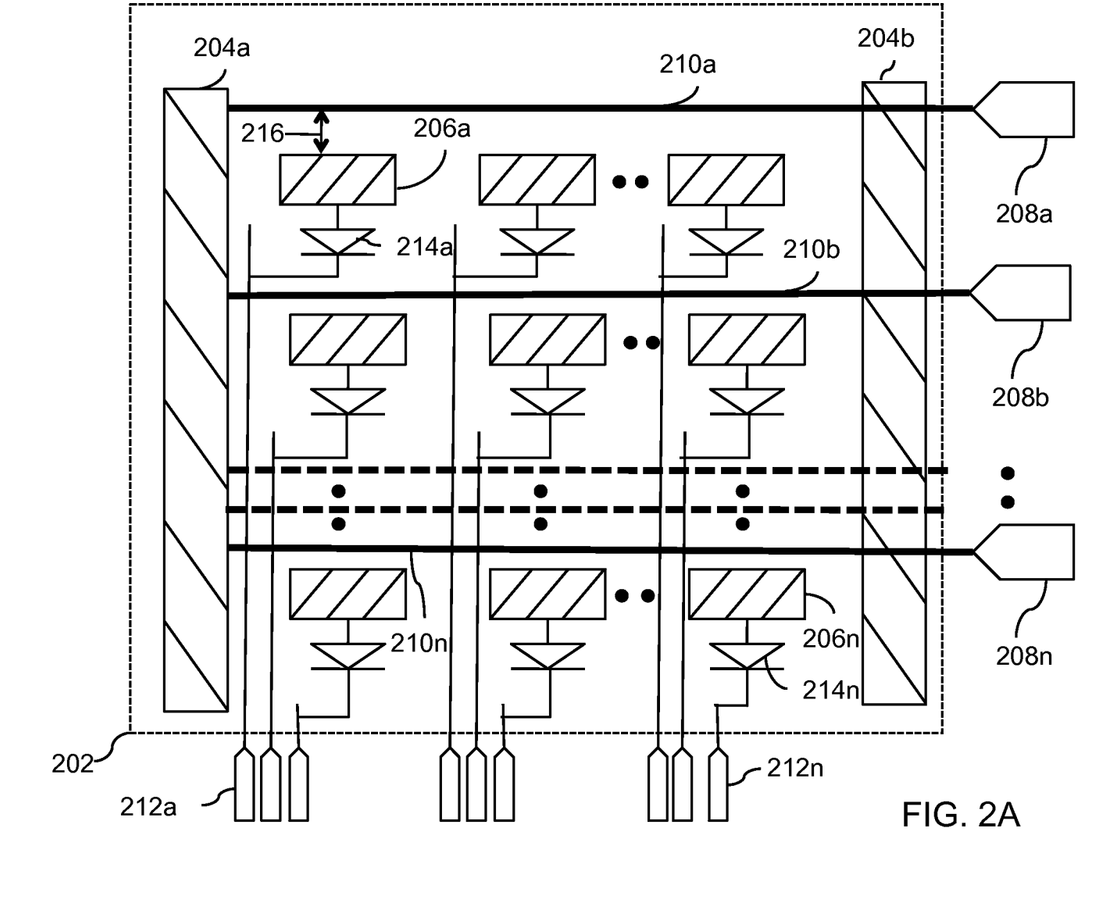
FIG. 2A illustrates various components of an exemplary switching system having individual second ports, in accordance with an embodiment of the invention.

With reference to FIG. 2A various components switching system 104 may include a base surface 202, insulating blocks 204a-b, an array of conductive pads 206a-n, first ports 208a-n, conductive wires 210a-n, second ports 212a-n, and current restricting components 214a-n. Base surface 202 may be an insulating material. Base surface 202 ensures that no short circuit occurs between any points of the contacts mounted on it. Further, the insulating material of base surface 202 may be flexible. Array of conductive pads 206a-n may be disposed on base surface 202 in form of multiple rows and columns as illustrated with reference to FIG. 2A. In an embodiment, array of conductive pads 206a-n may be generated by printing a conductive material on an integrated circuit material. Examples of the conductive material include, but are not limited to, copper, gold, aluminum, silver and so forth. Each conductive pads 206a-n may be connected individually to second ports 212a-n. Further, conductive pads 206a-n may be maintained at a first electric potential. In an embodiment of the invention, the first electric potential may be a ground potential.

Conductive wires 210a-n are suspended over conductive pads 206a-n at a physical distance 216. Physical distance 216 may selected during design of device 102 based on the application of device 102. For example, physical distance 216 may be more in applications that require micro timing control of inputs. As shown in FIG. 2A, conductive wires 210a-n are suspended over the rows of conductive pads 206a-n. It will be apparent to a person skilled in the art that conductive wires 210a-n can be suspended over the columns of conductive pads 206a-n. Conductive wires 210a-n may be designed from any conductive material, length or thickness based on the application of device 102. Conductive wires 210a-n are suspended from insulating blocks 204a-b to first port 208. Insulating blocks 204a-b may be disposed on base surface 202 and provide tension to conductive wires 210a-n. The tension in conductive wires 210a-n provides a spring or elastic force. As a result, when the user removes the force, conductive wires 210a-n automatically regain a default position. Therefore, additional components to provide a spring force are not required in device 102.

Furthermore, insulating blocks 204a-b provide insulation among conductive wires 210a-n, thereby preventing any short circuit. As shown, insulating blocks 204a-b are arranged at the ends of the array of conductive pads 206a-n. In an embodiment of the invention, multiple insulating blocks 204a-b may be arranged between columns or rows formed by the array of conductive pads 206a-n. Insulating blocks 204a-b may be non-terminating. Therefore, a conductive wire suspended from the insulating blocks 204a-b is able to transmit current or signal without any restriction. However, insulating blocks 204a-b may restrict the flow of current among conductive wires 210a-n. In another embodiment of the invention, only a single insulating block 204 may be used to suspend conductive wires 210a-n from first ports 208a-n.

First ports 208a-n provides a second electric potential to conductive wires 210a-n. The second electric potential may be at an absolute relative difference from the first electric potential provided to conductive pads 206a-n. In an embodiment of the invention, the second electric potential is more than the first electric potential. Therefore, when the user contacts a conductive wire with a conductive pad, a current flows in switching system 104. Hence, each conductive pad 206a-n may act as an independent electrical switch and array of conductive pad 206a-n may acts as an array of electrical switches to take inputs from the user. Each electrical switch may considered in an 'off' state when the current is not flowing and an 'on' state when the current is flowing through the switch. Conductive pads 206a-n are connected to current restricting elements 214a-n at ends. Generally, electrical switches with array design encounter the issue of ghosting or masking. Typically, the ghosting or masking refers to the phenomena that occur when current flows in a wrong or unintended direction. This means that if two switches are closed on different columns but on adjacent rows, then current will flow in the wrong or unintended direction. As a result, a non-existent key press is detected. Current restricting elements 214a-n connected to conductive pads 206a-n, allow current to flow in only one direction. For example, the current may flow only from first port 208 to second ports 212a-n. Therefore, the issues of ghosting or masking may be prevented. Current restricting elements 214a-n may be semiconductor elements such as diodes.

Figure 2B:
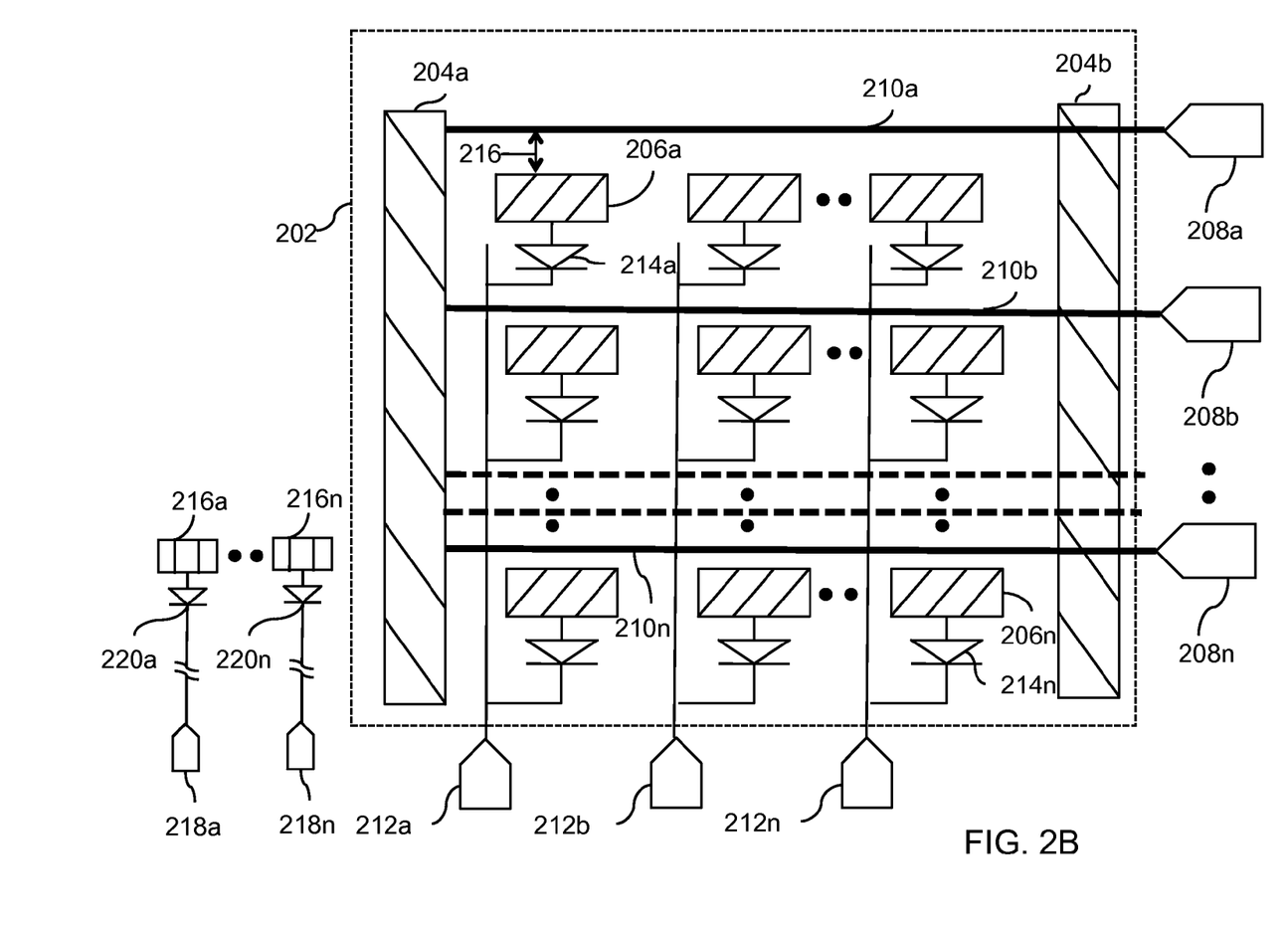
FIG. 2B illustrates various components of an exemplary switching system having shared second ports and conductive pins, in accordance with an embodiment of the invention.

Conductive pads 206a-n may share second ports 212a-n, as shown with reference to FIG. 2B. Therefore, the components required for switching system 104 may be further reduced. As shown with reference to FIG. 2B, switching system 104 may include conductive pins 216a-n. Conductive pins 216a-n may be connected to third ports 218a-n. Conductive pins 216a-n may be a movable and can contact any conductive wires 210a-n. The user may contact conductive pins 216a-n to conductive wires 210a-n to provide inputs. In an embodiment of the invention, the function of conductive pins 216a-n may be similar to that of conductive pad 206a-n. Further, conductive pins 216a-n may be connected to a current restricting elements 220a-n as shown. In another embodiment of the invention, conductive pins 216a-n may provide the second potential to conductive wires 210a-n. Conductive pins 216a-n are provided with a third electric potential. In an embodiment of the invention, the third electric potential may be equal to the first electric potential provided to conductive pads 206a-n. In another embodiment of the invention, the third potential may be equal to the second potential provided to conductive wires 210a-n.

Figure 3:
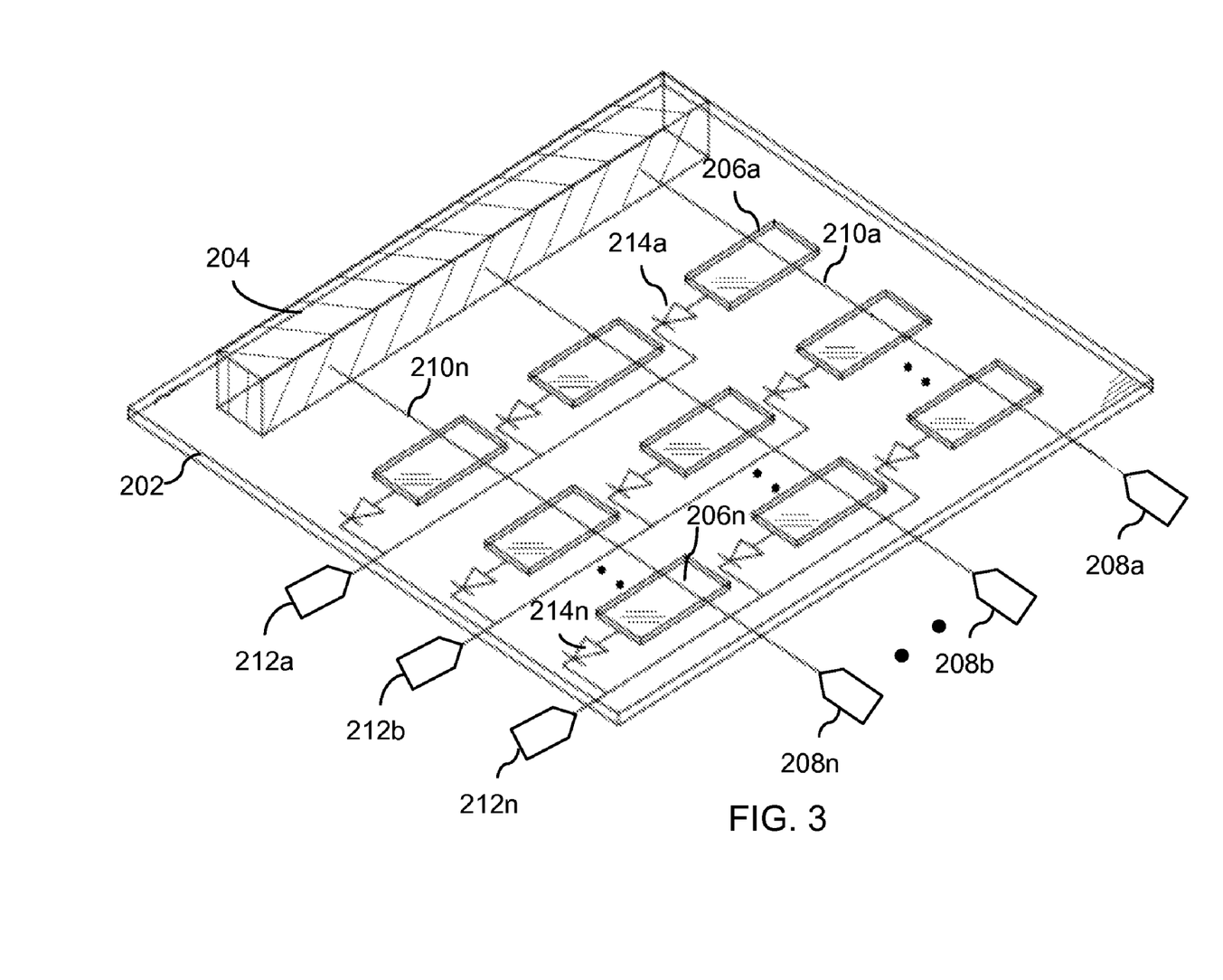
FIG. 3 is a perspective view of the switching system, in accordance with an embodiment of the invention.
Figure 4A:
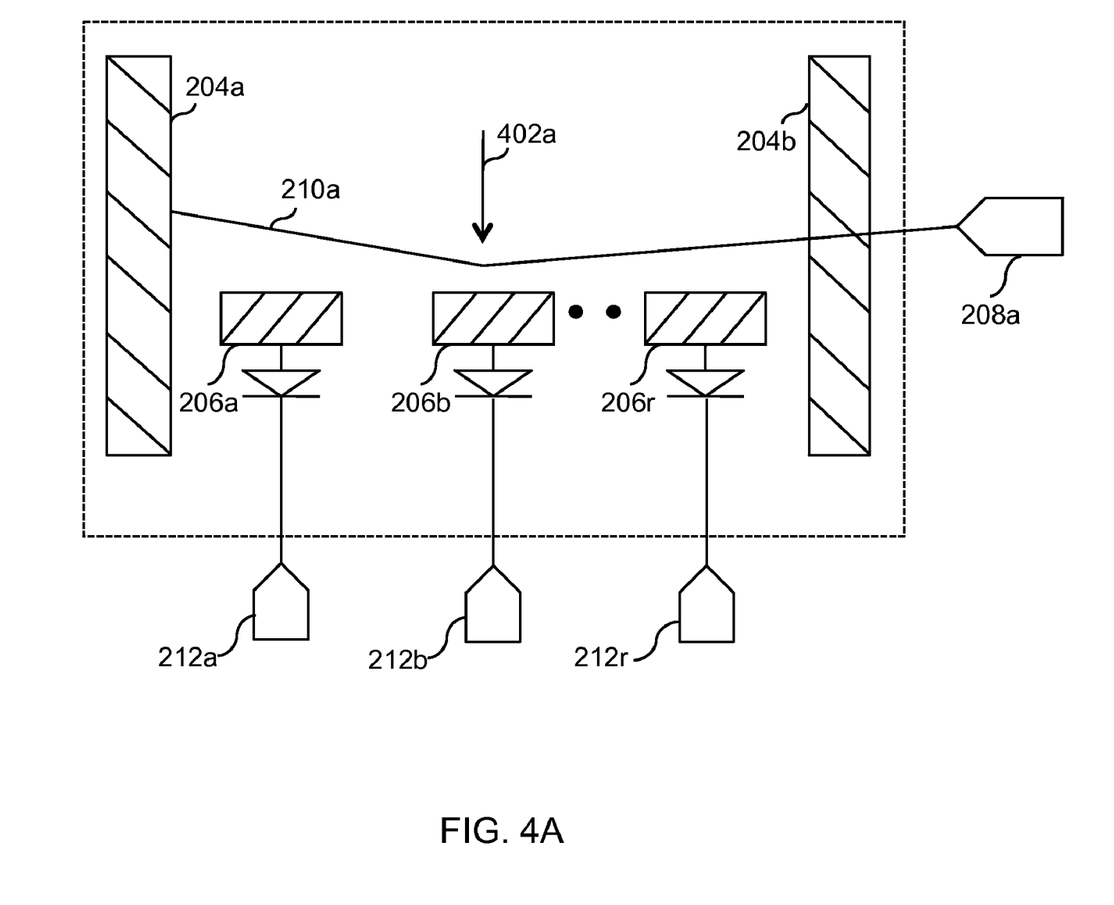
FIG. 4A illustrates an exemplary actuation of the switching system, in accordance with an embodiment of the invention.
Figure 4B:
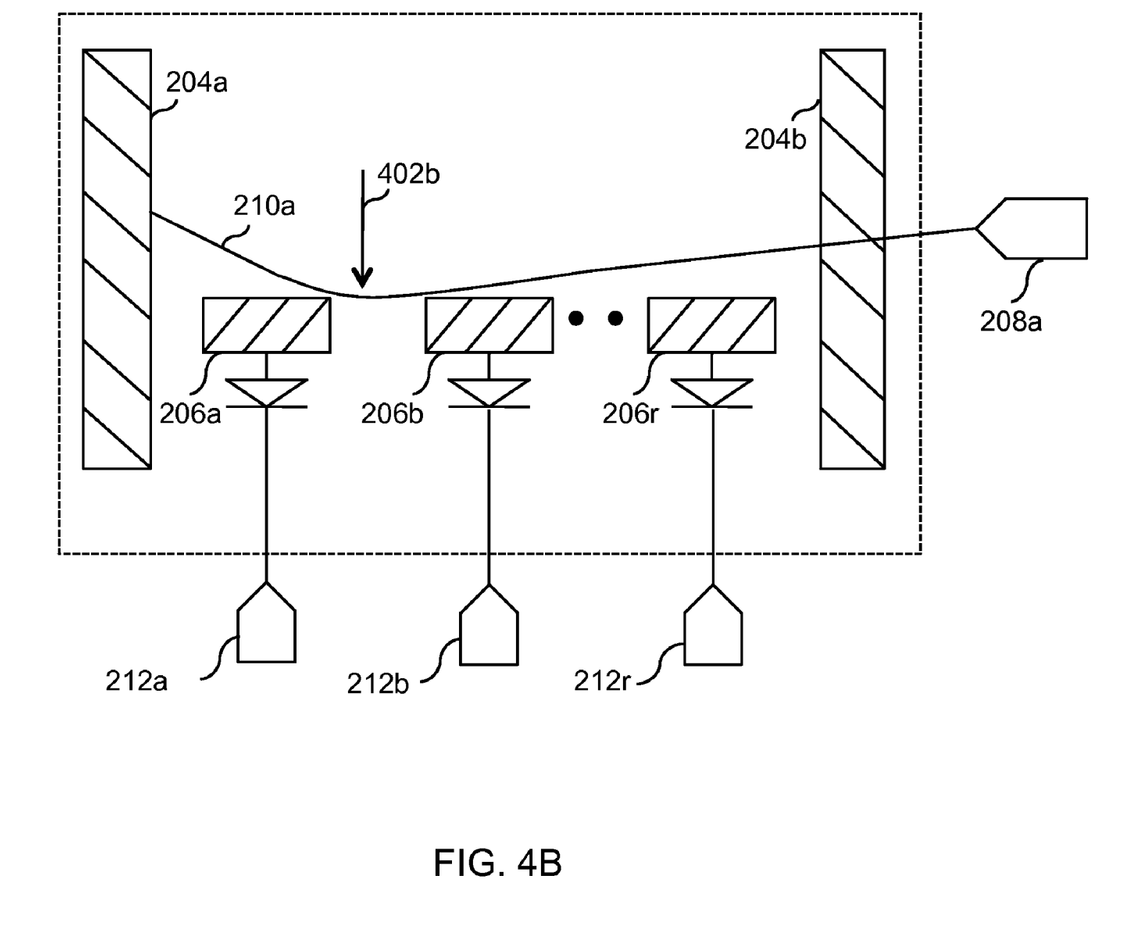
FIG. 4B illustrates another exemplary actuation of the switching system, in accordance with an embodiment of the invention.

An exemplary perspective view of switching system 104 is illustrated with reference to FIG. 3. Although there can be multiple insulating blocks 204, only a single insulating block 204 is illustrated in FIG. 3 for the sake of explanation, and does not restrict the scope of the invention. As illustrated, conductive wires 210a-n are suspended from insulating block 204 over conductive pads 206a-n. Electrical switches formed by conductive wires 210a-n and conductive pads 206a-n may be actuated as shown with reference to FIGS. 4A and 4B. With reference to FIG. 4A, an exemplary actuation of switches in switching system 104 is explained with only a single conductive wire 210a that may be suspended over conductive pads 206a-r. A person skilled in the art will appreciate that other electrical switches formed by conductive wires 210a-n and conductive pads 206a-n, may function is similarly. The user may press conductive wire 210a as shown by arrow 402a to contact it with conductive pad 206b. As a result, current flows between first port 208a and second port 212b. Similarly, when the user presses conductive wire 210a to contact with conductive pad 206a, then a current flows between first port 208a and second port 212a. The user may press various conductive wires 210a-n simultaneously. Further, the user may press various conductive wires 210a-n on various conductive pads 206a-n to provide inputs. For example, the user may press conductive wire 210a to contact conductive pad 206a and 206r. The inputs provided by the user are monitored and analyzed by monitoring system 106. With reference to FIG. 4B, another exemplary actuation of the switches in switching system 104 is illustrated. The user may press conductive wire 210a as shown by an arrow 402b. As a result, conductive wire 210a may contact both conductive pads 206a and 206b. Therefore, current flows between first port 208a and second ports 212a and 212b. The user can therefore, provide inputs by contacting a single conductive wire to multiple conductive pads. A person skilled in the art will appreciate that multiple conductive wires may be contacted with multiple conductive pads in the configuration discussed with reference to FIG. 4B to provide inputs. Furthermore, the elements of switching system 104 may be designed to provide the configurations as discussed in conjunction with FIGS. 4A and 4B. For example, the size or area of conductive pads may be designed so that conductive wires can touch multiple conductive pads.

Figure 5:
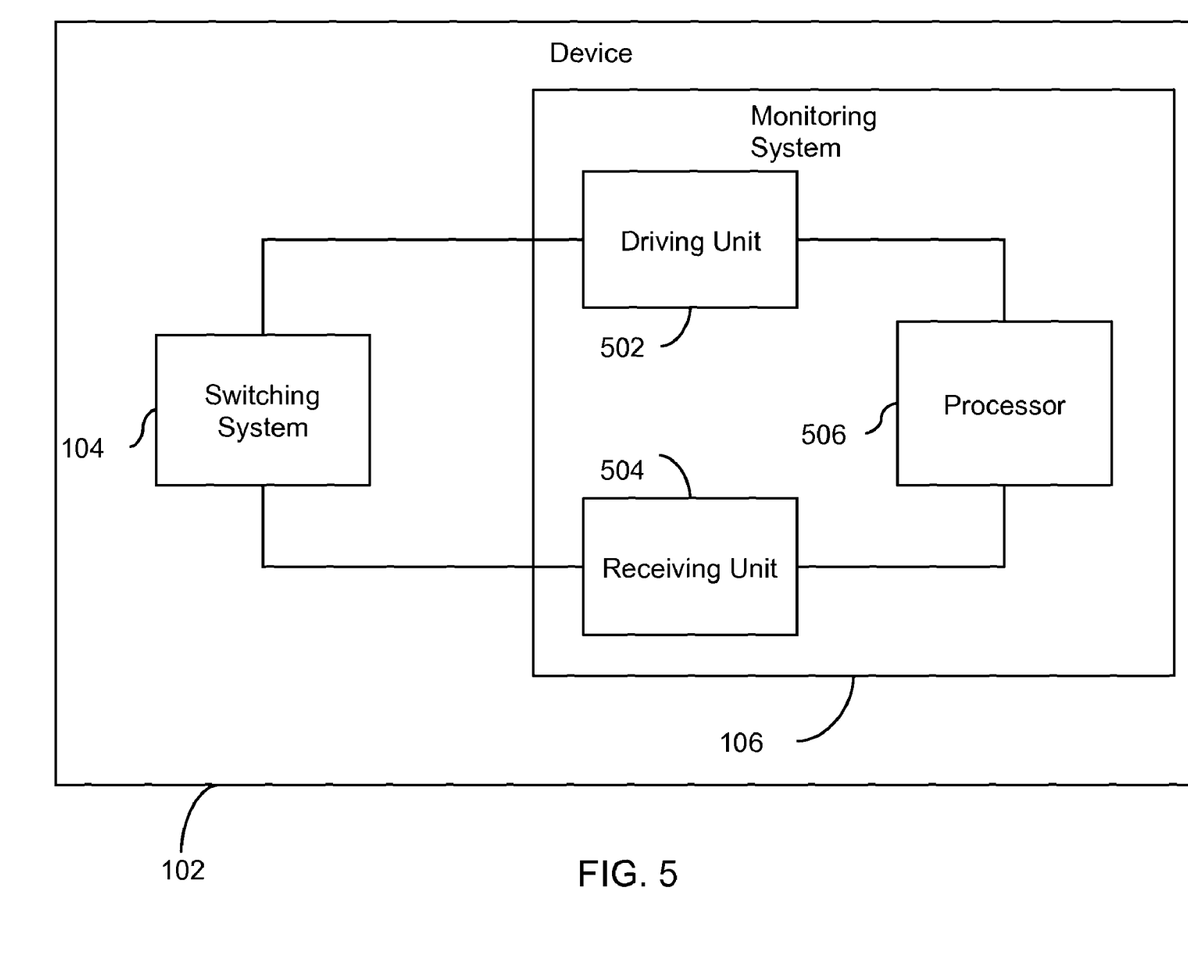
FIG. 5 is a block diagram illustrating various components of an monitoring system of the device, in accordance with an embodiment of the invention.

FIG. 5 is an exemplary block diagram illustrating various components of monitoring system 106 of device 102. Monitoring system 106 may include a driving unit 502, a receiving unit 504 and a processor 506. In an embodiment of the invention, monitoring system 106 may be implement as an Application Specific Integrated Circuit (ASIC) on device 102.

Driving unit 502 is connected to first ports 208a-n of switching system 104 to provide electric current or signals to conductive wires 210a-n. Driving unit 502 provides the current or signals are based on instructions received from processor 506, this is hereinafter referred to as polling of conductive wires 210a-n. Driving unit 502 polls conductive wires 210a-n at a pre-defined frequency. The pre-defined frequency may be based on the application of device 102. However, a person skilled in the art will appreciate that the pre-defined frequency is more than the rate at which the user can provide inputs to device 102. In an embodiment of the invention, driving unit 502 polls conductive wires 210a-n at a dynamic frequency. Therefore, the frequency of the polling may be defined during the functioning of switching system 104. In another embodiment of the invention, driving unit 502 polls conductive wires 210a-n based on events. Driving unit 502 polls each conductive wires 210a-n independently. Further, driving unit 502 may polls each conductive wires 210a-n sequentially. For example, conductive wire 210a may be polled followed by conductive wire 210b, and similarly other conductive wires may be polled. In an embodiment of the invention, the sequence of polling is pre-defined based on the application of device 102. In another embodiment of the invention, the sequence of polling may be adjusted dynamically.

When the user contacts a conductive wire to a conductive pad an electrical circuit is completed. Subsequently, the signal or current sent by driving unit 502 through a first port is received at a second port of switching system 104. For example, as shown with reference to FIG. 4, when conductive wire 210a contacts conductive pad 210b, then the signal is received at second port 212b. Therefore, a conductive wire pressed and the corresponding conductive pad can be judged based on the signal received at second port 212b. However, as discussed above the user may press multiple conductive wires 210a-n on multiple conductive pads 206a-n. Therefore, driving unit 502 polls each conductive wire 210a-n sequentially, and corresponding result of the polling are received at receiving unit 504 through second ports 212a-n.

Receiving unit 504 may be connected to switching system 104 through second ports 212a-n. Furthermore, receiving unit 504 may be connected to conductive pins 216a-n through third ports 218a-n. The result received by receiving unit 504 may be in form of signals or currents. The result is obtained by polling switching system 104, and therefore may indicate an existing status of switching system 104. The existing status of switching system 104 may include an existing status of conductive pads 206a-n. The existing status of conductive pads 206a-n may indicate whether the current or signal is received from conductive pads 206a-n. For example, as shown with reference to FIG. 4, when conductive wire 210b contacts conductive pad 208b then a current or signal of polling may flow to second port 212b. In this case, the existing status of conductive pad 208b may be stored by receiving unit 504 as 'active'. Similarly, when a current is not flowing the status is stored as 'inactive'. Further, the existing status of switching system 104 may include an existing status of conductive pin 216. As discussed above, the existing status of conductive pin 216 can be 'active' or 'inactive' based on whether the current is flowing or not. In an embodiment of the invention, existing status of conductive pin 216 may include various pre-set parameters associated with conductive pin 216, such as duration of contact, and so forth. The result may be stored by receiving unit 504 in a register, in an embodiment of the invention. Driving unit 502 continuously polls conductive wires 210a-n sequentially and the result of polling is accordingly updated in the register by receiving unit 504. In an embodiment of the invention, a last status of polling is stored along with the existing status of switching system 104. The last status is here after referred to as previous status of switching system 104.

Processor 506 analyzes the results stored by receiving system 504 to generate an output corresponding to the inputs provided by the user. For example, processor 506 reads the existing status of a conductive pad as 'active' and may correspondingly generate an output associated with the conductive pad. The output may be present to the user as mechanical, visual or audible feedback.

In an embodiment of the invention, processor 506 compares the previous status with the existing status of switching system 104, to generate an output. For example, the previous status of conductive pins 216a-n may be compared to the existing status of conductive pins 216a-n. Assuming that the previous status of conductive pins 216a-n was 'active' and the existing status is 'inactive', then processor 506 may generate output corresponding to existing status of conductive pads 206a-n and conductive pins 216a-n. In an embodiment of the invention, the output is generated by processor 506 based on pre-set parameters associated with conductive pins 216a-n. Further, processor 506 may store the previous status of switching system 104 in a register. Processor 506 may include software or firmware to provide instructions to driving unit 502 and receiving unit 504. In an embodiment of the invention, driving unit 502 and receiving unit 504 may be electrical or electronic circuits driven on instructions provided by processor 506. In another embodiment of the invention, driving unit 502 and receiving unit 504 may be components of processor 506.

With the above components and design thereof in mind, it should be appreciated that alternative components, constructions and materials can be used to accomplish the benefits derived from device 102. For example, monitoring system 106 may comprise more than one processor. Further, the functionality of receiving unit 504 may be incorporated in driving unit 502. Moreover, driving unit 502 may be connected to second ports 212a-n and receiving unit 504 may be connected to first ports 208a-n.

Having discussed the exemplary embodiments and contemplated modifications, it should be appreciated that a method for registering inputs provided by the user and generating a corresponding is also contemplated. According to this method, a device is provided. The device may include a switching system and an monitoring system. The switching may include an array of conductive pads and one or more conductive wires suspended over the array of conductive pads. The monitoring system includes a processor, a driving unit, and a receiving unit.

The driving unit of monitoring system continuously polls the conductive wires of the switching system sequentially. Therefore, when the user presses the conductive wires to contact the conductive pads, the receiving unit may receive a result of polling. The result of polling may include an existing status of the switching unit. The existing status of the switching unit may include an existing status of the conductive pads. In an embodiment of the invention, the existing status of the switching system may further include an existing status of multiple conductive pins connected to third ports. Further, the receiving unit may store the result in a register. Moreover, the receiving unit may store a previous state of the switching system in the register.

Thereafter, the processor processes the result of polling to generate an output corresponding to the inputs provided by the user. In an embodiment of the invention, the processor compares the existing status to the previous status. Thereafter, the output is generated based on the difference in the previous status and the existing status. For example, the previous state of the conducting pins is compared with the existing state of the conducting pins, and correspondingly an output is generated based on the existing status of the conductive pads and the pre-set parameters associated with the conductive pins. In an embodiment of the invention, the processor may store the result of polling in a register.

While the invention has been described in connection with what is presently considered to be the most practical and various embodiments, it is to be understood that the invention is not to be limited to the disclosed embodiments, but on the contrary, is intended to cover various modifications and equivalent arrangements included within the spirit and scope of the appended claims.

This written description uses examples to disclose the invention, including the best mode, and also to enable any person skilled in the art to practice the invention, including making and using any devices or systems and performing any incorporated methods. The patentable scope the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An electronic apparatus for registering inputs provided by a user, comprising:
   a switching system comprising:
      a base surface;
      one or more insulating blocks disposed on the base surface;
      an array of conductive pads arranged on the base surface, wherein the array of conductive pads comprises one or more rows and one or more columns of conductive pads, and wherein the conductive pads are provided with a first electric potential; and
      one or more conductive wires suspended from the one or more insulating blocks, wherein the conductive wires are suspended at a physical distance over the one or more rows of conductive pads, and wherein the conductive wires are provided independently with a second electric potential,
      wherein the inputs are registered when the user contacts the one or more conductive wires with the one or more conductive pads; and
   a monitoring system coupled to the switching system, wherein the monitoring system analyzes the inputs to generate a corresponding output to the user.

2. The electronic apparatus of claim 1, wherein the switching system further comprises one or more current restricting components coupled to one or more conductive pads in the array of conductive pads.

3. The electronic apparatus of claim 2, wherein the one or more current restricting components are configured to allow a unidirectional flow of current.

4. The electronic apparatus of claim 2, wherein the current restricting elements comprise diodes.

5. The electronic apparatus of claim 1, wherein the second electric potential is provided to conductive wires from one or more first ports.

6. The electronic apparatus of claim 1, wherein each conductive pad in the array of conductive pads is connected to one or more second ports.

7. The electronic apparatus of claim 1, wherein the switching system further comprising one or more conductive pins connected to one or more third ports, the conductive pin being provided with a third electric potential, and wherein the one or more conductive pins are movable to contact the one or more conductive wires.

8. The electronic apparatus of claim 7, wherein the user provides inputs by pressing the one or more conductive pins to the one or more conductive wires.

9. The electronic apparatus of claim 1, wherein the monitoring system comprises:
   a processor;
   a driving unit coupled to the processor and one or more first ports of the conductive wires, wherein the driving unit is configured to poll the conductive wires based on instructions from the processor; and
   a receiving unit coupled to the processor and one or more second ports of the array of conductive pads, wherein the receiving unit is configured to receive a result of polling performed by the driving circuit,
   wherein an output is generated by the processor based on the result of the polling.

10. The electronic apparatus of claim 9, wherein the receiving unit comprises one or more registers to store the result.

11. The electronic apparatus of claim 9, wherein the result comprises an existing status of the switching system.

12. The electronic apparatus of claim 11, wherein the existing status of the switching system comprises an existing status of the one or more conductive pads in the array of conductive pads.

13. The electronic apparatus of claim 11, wherein the existing status of the switching system comprises an existing status of the conductive pin.

14. The electronic apparatus of claim 9, wherein the processor is configured to:
   compare the existing status with a previous status of the switching system, wherein the output is generated based on the difference in the existing status from the previous status.

15. The electronic apparatus of claim 9, wherein the processor is configured to store the previous status of the switching system in a register.

16. The electronic apparatus of claim 9, wherein the receiving unit is connected to one or more third ports.

17. The electronic apparatus of claim 1, wherein the one or more conductive wires are configured to provide a mechanical feedback to the user.

18. The electronic apparatus of claim 1, wherein the one or more conductive wires are configured to provide a visual feedback to the user.

19. The electronic apparatus of claim 1, wherein the one or more conductive wires are configured to provide an audio feedback to the user.

20. The electronic apparatus of claim 1, wherein the one or more conductive wires may be suspended between the one or more insulating blocks, wherein the one or more insulating blocks comprises one or more non-terminating insulating blocks.

21. The electronic apparatus of claim 1, wherein the one or more insulating blocks are arranged in one or more configurations including at ends of the array of conductive pads, between the columns of the array of conductive pads, and between the rows of the array of conductive pads.

22. The electronic apparatus of claim 1, wherein the conductive wires are tensioned over the array of conductive pads.

23. The electronic apparatus of claim 1, wherein the conductive wires comprise an elastic material.

24. The electronic apparatus of claim 1, wherein the base surface comprises an insulating material.

25. An electronic apparatus for registering inputs provided by a user and generating a corresponding output, comprising:
   a switching system comprising:
      a base surface;
      one or more insulating blocks disposed on the base surface;
      an array of conductive pads arranged on the base surface, the conductive pads being provided with a first electric potential, wherein the array of conductive pads comprises one or more rows and one or more columns of conductive pads, and wherein each conductive pad in the array of conductive pads is connected to one or more second ports; and
      one or more conductive wires suspended from the one or more insulating blocks, wherein the conductive wires are suspended at a physical distance over the one or more rows of conductive pads, and wherein the conductive wires are provided independently with a second electric potential from one or more first port; and
      one or more conductive pins connected to one or more third ports, the conductive pins being provided with a third potential, wherein the conductive pins are movable to contact the one or more conductive wires, wherein the inputs are provided by the user by contacting the one or more conductive wires to the one or more conductive pads and/or the conductive pins; and a monitoring system coupled to the switching system, comprising:
  a processor configured to generate the output;
  a driving unit coupled to the processor and the one or more first ports, wherein the driving unit is configured to poll the conductive wires independently based on instructions from the processor; and
  a receiving unit coupled to the processor and the one or more second ports and the one or more third ports, wherein the receiving unit is configured to receive a result of polling performed by the driving circuit,
wherein the output is generated by the processor based on the result of the polling.

26. The electronic apparatus of claim 25, wherein the result comprises an existing status of the switching system.

27. The electronic apparatus of claim 26, wherein the existing status of the switching system comprises an existing status of the one or more conductive pads in the array of conductive pads.

28. The electronic apparatus of claim 26, wherein the existing status of the switching system comprises an existing status of the conductive pin.

29. The electronic apparatus of claim 25, wherein the receiving unit comprises one or more registers to store the result.

30. The electronic apparatus of claim 25, wherein the inputs are provided by the user by pressing the conductive pin to one or more conductive wires.

31. The electronic apparatus of claim 25, wherein the processor is configured to:
  compare the existing status with the previous status of the switching system, wherein the output is generated based on the difference in the existing status from the previous status.

32. The electronic apparatus of claim 25, wherein the processor is configured to store the previous status of the switching system in a register.

33. The electronic apparatus of claim 25, wherein the switching system further comprises one or more current restricting components coupled to one or more conductive pads in the array of conductive pads.

34. The electronic apparatus of claim 33, wherein the one or more current restricting components are configured to allow a unidirectional flow of current.

35. The electronic apparatus of claim 25, wherein the conductive wires are tensioned over the array of conductive pads.

36. A method of registering inputs provided by a user and generating a corresponding output, comprising:
  providing an electronic apparatus comprising a switching system and an monitoring system, the switching comprising: an array of conductive pads, one or more conductive wires suspended over the array of conductive pads, and the monitoring system comprising a processor, a driving unit, a receiving unit;
  pressing the one or more conductive wires by the user to contact the one or more conductive pads in the array of conductive pads;
  polling the conductive wires independently by the driving unit based on instructions from the processor;
  receiving a result of the polling by the receiving unit, wherein the result comprises an existing status of the switching system; and
  processing the result by the processor to register the inputs provided by the user to generate the output.

37. The method of claim 36, wherein the result comprises an existing status of the switching system.

38. The method of claim 37, wherein the existing status of the switching system comprises an existing status of the one or more conductive pads in the array of conductive pads.

39. The method of claim 37 wherein the existing status of the switching system comprises an existing status of one or more conductive pins of switching system.

40. The method of claim 36 further comprising providing a mechanical feedback to the user.

41. The method of claim 36 further comprising providing a visual feedback to the user.

42. The method of claim 36, wherein the step of polling comprises sequentially polling the one or more conductive wires.

43. The method of claim 36, wherein the step of processing comprises:
  comparing an existing status with a previous status of the switching system; and
  generating the output based on the difference in the existing status from the previous status.

44. The method of claim 36 further comprising storing the result in a register.

* * * * *